US012266995B2

(12) United States Patent
Danh et al.

(10) Patent No.: US 12,266,995 B2
(45) Date of Patent: Apr. 1, 2025

(54) MOTOR AND DRIVE APPARATUS HAVING A CONDUCTIVE BEARING

(71) Applicant: NIDEC CORPORATION, Kyoto (JP)

(72) Inventors: Ho Quang Danh, Kyoto (JP); Kenichiro Hamagishi, Kyoto (JP); Takahiro Uetani, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 295 days.

(21) Appl. No.: 17/948,232

(22) Filed: Sep. 20, 2022

(65) Prior Publication Data

US 2023/0093962 A1 Mar. 30, 2023

(30) Foreign Application Priority Data

Sep. 28, 2021 (JP) ................................. 2021-157614

(51) Int. Cl.
*H02K 7/08* (2006.01)
*H02K 11/21* (2016.01)
*B60K 1/00* (2006.01)

(52) U.S. Cl.
CPC ............. *H02K 7/083* (2013.01); *H02K 11/21* (2016.01); *B60K 2001/001* (2013.01)

(58) Field of Classification Search
CPC ... H02K 7/083; H02K 11/21; B60K 2001/001
USPC ......................................................... 310/90
See application file for complete search history.

(56) References Cited

U.S. PATENT DOCUMENTS

| | | | |
|---|---|---|---|
| 10,128,705 B2 | 11/2018 | Yang et al. | |
| 2019/0162181 A1* | 5/2019 | Yamaguchi | F04C 15/06 |
| 2022/0196135 A1* | 6/2022 | Tamura | F16H 57/021 |
| 2022/0271603 A1* | 8/2022 | Makino | H02K 7/083 |
| 2022/0271614 A1* | 8/2022 | Makino | H02K 11/40 |
| 2022/0286012 A1* | 9/2022 | Nakata | H02K 11/40 |
| 2022/0294317 A1* | 9/2022 | Nakamura | H02K 5/04 |
| 2022/0385145 A1* | 12/2022 | Okamoto | H02K 5/225 |
| 2023/0006500 A1* | 1/2023 | Shimogai | H02K 9/19 |
| 2023/0006507 A1* | 1/2023 | Nakamura | H02K 5/16 |
| 2023/0007761 A1* | 1/2023 | Shiraishi | H05F 3/02 |
| 2023/0082913 A1* | 3/2023 | Nakamatsu | F16H 57/021 475/84 |
| 2023/0090548 A1* | 3/2023 | Ishikawa | H02K 5/203 310/68 D |
| 2023/0304571 A1* | 9/2023 | Fujikawa | H02K 7/006 |
| 2023/0313877 A1* | 10/2023 | Oshidari | F16H 57/0441 475/159 |
| 2023/0313878 A1* | 10/2023 | Fujikawa | F16H 57/0441 475/160 |

(Continued)

*Primary Examiner* — Rashad H Johnson
(74) *Attorney, Agent, or Firm* — HAUPTMAN HAM, LLP

(57) ABSTRACT

A motor housing includes a bearing holder that holds a first bearing and accommodates a rotor and a stator. A second bearing is disposed inside a motor shaft at one axial end portion of the motor shaft and has lower electric resistance than the first bearing. The conductive member electrically connects the second bearing to a motor housing. The radially outer end portion of the second bearing is in contact with the inner peripheral surface of the motor shaft. The contact portion of the conductive member is in contact with the radially inner end portion of the second bearing. The fixed portion is fixed to the motor housing radially outward of the motor shaft. A bridge portion connects the contact portion and the fixed portion.

15 Claims, 3 Drawing Sheets

(56) References Cited

U.S. PATENT DOCUMENTS

| | | | |
|---|---|---|---|
| 2024/0026963 A1* | 1/2024 | Fujikawa | H02K 9/19 |
| 2024/0229916 A1* | 7/2024 | Oota | F16H 57/0006 |
| 2024/0229921 A1* | 7/2024 | Kosaka | F16H 57/0423 |
| 2024/0258894 A1* | 8/2024 | Niwa | H02K 3/04 |
| 2024/0278636 A1* | 8/2024 | Yokoyama | F16H 57/0424 |

* cited by examiner

MOTOR AND DRIVE APPARATUS HAVING A CONDUCTIVE BEARING

CROSS-REFERENCE TO RELATED APPLICATIONS

The present invention claims priority under 35 U.S.C. § 119 to Japanese Patent Application No. 2021-157614 filed on Sep. 28, 2021, the entire content of which is incorporated herein by reference.

FIELD OF THE INVENTION

The present invention relates to a motor and a drive apparatus.

BACKGROUND

Conventionally, there has been known a drive apparatus that neutralizes a motor shaft using a conductive bearing such as a rotor discharge bearing and a conductive member such as a conductive tab. For example, a rotor discharge bearing is attached to the motor shaft. The conductive tab extends from a portion of the case which covers the axial end portion of the motor shaft and contacts the rotor discharge bearing. The motor shaft is electrically connected to the case through the rotor discharge bearing and the conductive tab.

However, when the conductive member is disposed in a part of the case such as a lid that covers the axial end portion of the motor shaft, it may be necessary to simultaneously assemble the other of the motor shaft and the case with respect to one of the motor shaft and the case and bring the conductive member into contact with the conductive bearing. In this case, it is difficult to attach the conductive member.

SUMMARY

An exemplary motor of the present invention includes a tubular motor shaft, a rotor, a stator, a first bearing, a motor housing, a second bearing, and a conductive member. The motor shaft extends in an axial direction along a rotation axis. The rotor is rotatable together with the motor shaft about the rotation axis. The stator radially faces the rotor with a gap interposed therebetween. The first bearing rotatably supports the motor shaft. The motor housing includes a bearing holder that holds the first bearing, and accommodates the rotor and the stator. The second bearing is disposed inside the motor shaft at one axial end portion of the motor shaft and has lower electric resistance than the first bearing. The conductive member electrically connects the second bearing to the motor housing. A radially outer end portion of the second bearing is in contact with the inner peripheral surface of the motor shaft. The conductive member includes a contact portion, a fixed portion, and a bridge portion. The contact portion is in contact with a radially inner end portion of the second bearing. The fixed portion is fixed to the motor housing radially outward of the motor shaft. The bridge portion connects the contact portion and the fixed portion.

An exemplary drive apparatus of the present invention includes the motor and a power transmission device. The power transmission device transmits power of the motor to a drive shaft.

The above and other elements, features, steps, characteristics and advantages of the present disclosure will become more apparent from the following detailed description of the preferred embodiments with reference to the attached drawings.

DETAILED DESCRIPTION

Figure 1:
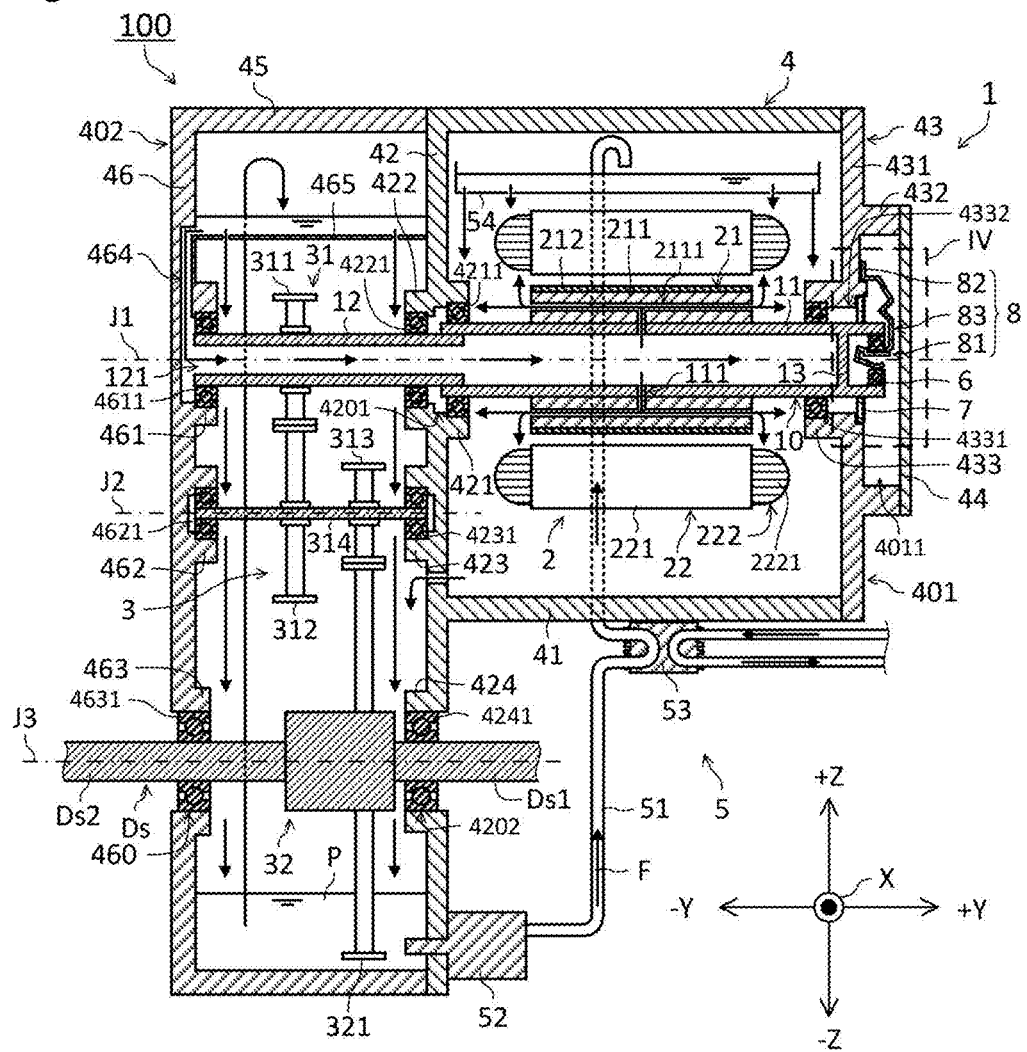
FIG. 1 is a conceptual sectional view illustrating a configuration example of a drive apparatus.

Exemplary embodiments will be described with reference to the drawings hereinafter.

The following description will be made with a gravity direction being partitioned based on a positional relationship in a case where a drive apparatus 100 is mounted in a vehicle 300 located on a horizontal road surface. In the drawings, an XYZ coordinate system is appropriately illustrated as a three-dimensional orthogonal coordinate system. In the XYZ coordinate system, a Z-axis direction indicates a vertical direction (that is, up-down direction). The +Z direction indicates an upward direction (a vertically upward direction opposite to the gravity direction). The −Z direction indicates a downward direction (vertically downward in the same direction as the gravity direction).

In addition, an X-axis direction is a direction orthogonal to the Z-axis direction and illustrates a front-rear direction of the vehicle 300 in which the drive apparatus 100 is mounted. The +X direction indicates the front of the vehicle 300. The −X direction indicates the rear of the vehicle 300. However, the +X direction can be the rear of the vehicle 300, and the −X direction can be the front of the vehicle 300.

The Y-axis direction is a direction perpendicular to both the X-axis direction and the Z-axis direction, and is a width direction (right-left direction) of the vehicle 300. The Y-axis direction is an example of the "axial direction" in the present invention and is parallel to, for example, a rotation axis J1 of a motor 1. The +Y direction is an example of "one axial direction" in the present invention and indicates the right side of the vehicle 300. The −Y direction is an example of "the other axial direction" in the present invention and indicates the left side of the vehicle 300. However, when the +X direction is the rear of the vehicle 300, the Y direction can be the right side of the vehicle 300, and the +Y direction can be the left side of the vehicle 300. That is, regardless of the X-axis direction, the −Y direction simply becomes one of the right and left directions of the vehicle 300, and the +Y direction becomes the other of the right and left directions of the vehicle 300. In addition, depending on a method for mounting the drive apparatus 100 on the vehicle 300, the X-axis direction can be the widthwise direction (right-left direction) of the vehicle 300, and the Y-axis direction can be the front-rear direction of the vehicle 300.

In the following description, a direction orthogonal to a predetermined axis such as the rotation axis J1 is simply referred to as a "radial direction", and a circumferential direction around the predetermined axis is referred to as a "circumferential direction". Of the radial directions, a direction approaching the predetermined axis is referred to as a "radially inner side", and a direction separating from the predetermined axis is referred to as a "radially outer side".

In the present specification, in the positional relationship between any one of orientations, lines, and surfaces and another one, the term "parallel" means not only a state where both never cross each other no matter how long they extend, but also a state where both are substantially parallel. In addition, the term "perpendicular" includes not only a state where both intersect each other at 90 degrees, but also a state where both are substantially perpendicular. That is, the terms "parallel" and "perpendicular" each include a state where the positional relationship between both permits an angular deviation to a degree that does not depart from the gist of the present invention.

In the present specification, an "annular shape" includes not only a shape continuously connected without any cut along the entire circumferential direction about a predetermined axis such as the rotation axis J1 but also a shape having one or more cuts in a part of the entire circumference direction about the predetermined axis. In addition, a shape that draws a closed curve around a predetermined axis in a curved surface intersecting with the predetermined axis is also included.

Note that these are names used merely for description, and are not intended to limit actual positional relationships, directions, names, and the like.

Figure 2:
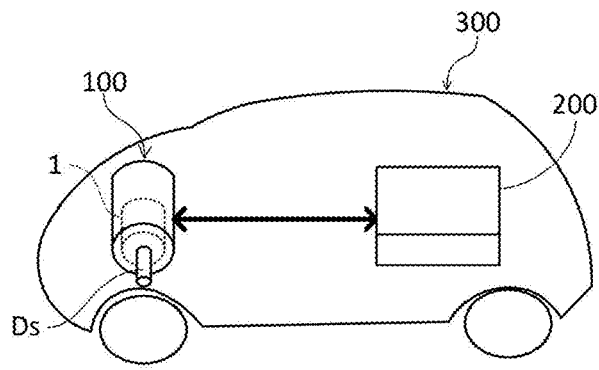
FIG. 2 is a schematic diagram illustrating an example of a vehicle having the drive apparatus mounted thereon.
Figure 3:
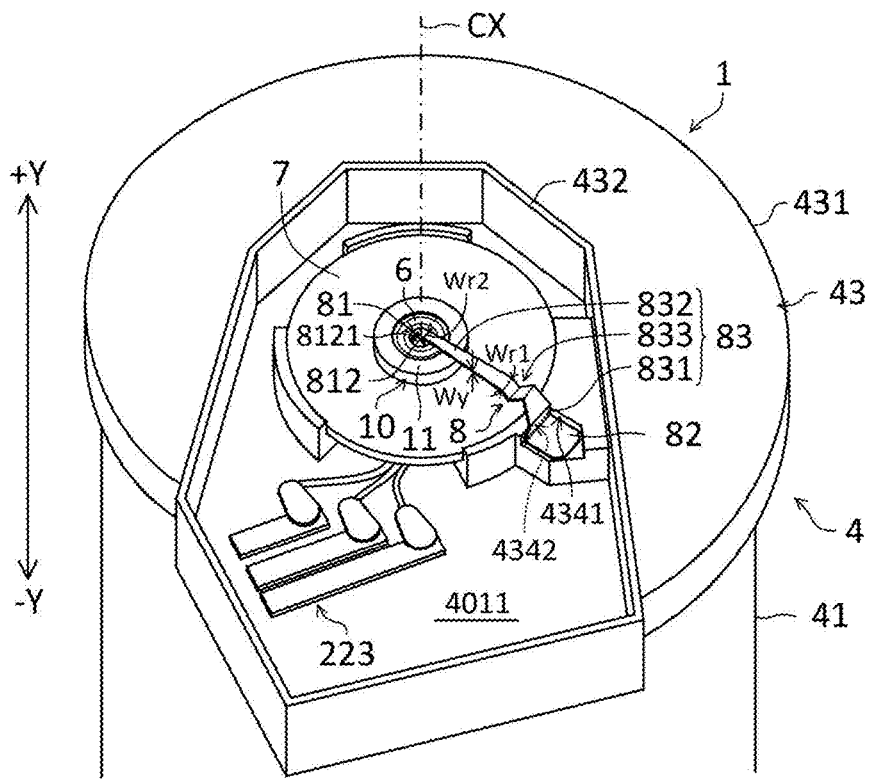
FIG. 3 is a perspective view of the drive apparatus on the +Y direction side according to the embodiment.
Figure 4:
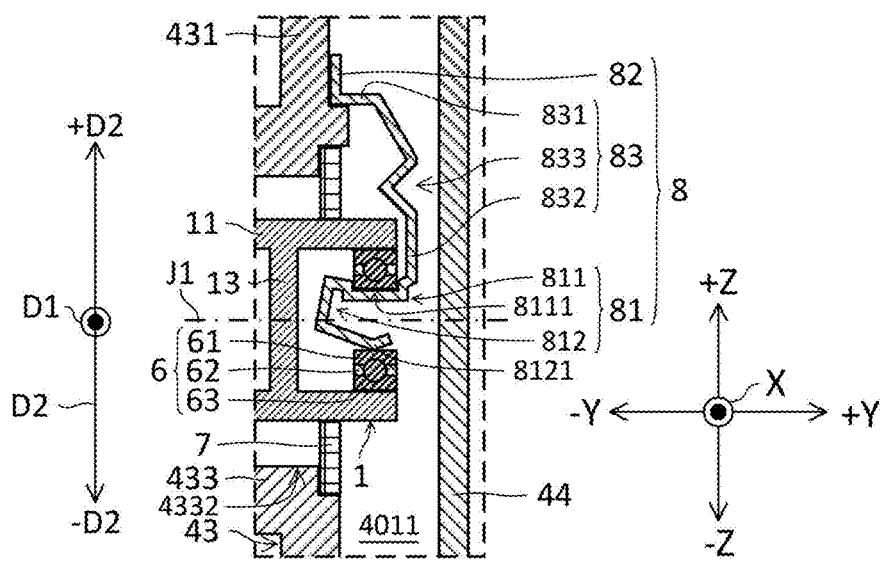
FIG. 4 is a conceptual sectional view of the main part of the drive apparatus according to the embodiment.

FIG. 1 is a conceptual sectional view illustrating a configuration example of the drive apparatus 100. FIG. 2 is a schematic diagram illustrating an example of the vehicle 300 having the drive apparatus 100 mounted thereon. FIG. 3 is a perspective view of the drive apparatus 100 on the +Y direction side according to the embodiment. FIG. 4 is a conceptual sectional view of the main part of the drive apparatus according to the embodiment. Note that FIGS. 1 to 4 are merely conceptual diagrams, and a layout and a dimension of each portion are not necessarily identical to those of the actual drive apparatus 100 in a strict sense. FIG. 4 corresponds to a portion IV surrounded by the broken line in FIG. 1.

In the present embodiment, as illustrated in FIG. 2, the drive apparatus 100 is mounted on the vehicle 300 using at least the motor 1 as a power source. The vehicle 300 is, for example, a hybrid vehicle (HV), a plug-in hybrid vehicle (PHV), or an electric vehicle (EV). The vehicle 300 has the drive apparatus 100.

Referring to FIG. 2, the drive apparatus 100 drives the front wheels of the vehicle 300. However, the present invention is not limited to the example illustrated in FIG. 2, and the drive apparatus 100 may drive at least one of the wheels. In addition, the vehicle 300 further includes a battery 200. The battery 200 stores electric power to be supplied to the drive apparatus 100.

As illustrated in FIG. 1, the drive apparatus 100 includes the motor 1 and a gear portion 3. The gear portion 3 is a power transmission device that transmits the power of the motor 1 to a drive shaft Ds. According to the drive apparatus 100, as will be described later, the occurrence of electrolytic corrosion in the motor 1 can be effectively suppressed or prevented. In addition, a conductive member 8 for neutralizing a motor shaft 10 can be easily attached to a motor housing 401. The drive apparatus 100 further includes a housing 4, a fluid circulation portion 5, a conductive bearing 6, a detector 7, and the conductive member 8.

The motor 1 is a DC brushless motor. The motor 1 is a drive source of the drive apparatus 100 and is driven by electric power supplied from an inverter (not illustrated). The motor 1 is of an inner rotor type in which a rotor 21 is rotatably disposed radially inward of a stator 22. As illustrated in FIG. 1, the motor 1 includes the motor shaft 10, the rotor 21, and the stator 22.

The motor shaft 10 is rotatable about the rotation axis J1. The motor shaft 10 has a tubular shape extending in the Y-axis direction along the rotation axis J1. As described above, the motor 1 has the motor shaft 10. A fluid F flows inside the motor shaft 10. The drive apparatus 100 further includes the fluid F. Note that the fluid F is a lubricant that lubricates the gear portion 3 and each bearing of the drive apparatus 100, and is, for example, an automatic transmission fluid (ATF) in the present embodiment. In addition, the fluid F is used as a refrigerant for cooling the motor 1 and the like.

The motor shaft 10 includes a rotor shaft 11 and a gear shaft 12. The rotor shaft 11 holds the rotor 21. The gear shaft 12 is connected to the −Y direction side end portion of the rotor shaft 11. The rotor shaft 11 and the gear shaft 12 have a tubular shape extending in the Y-axis direction and extend along the rotation axis J1. In the present embodiment, the both are connected by spline fitting. Alternatively, the divided shafts may be connected by screw coupling using a male screw and a female screw or may be joined by a fixing method such as press-fitting and welding. When the fixing method such as press-fitting or welding is adopted, serrations combining recesses and protrusions extending in the Y-axis direction may be adopted. With such a configuration, it is possible to reliably transmit rotation from the rotor shaft 11 to the gear shaft 12. Note that the present invention is not limited to the example of the present embodiment, and the motor shaft 10 may be a single member.

The motor shaft 10 has a shaft through-hole 111. The shaft through-hole 111 is disposed in the rotor shaft 11 and penetrates the tubular rotor shaft 11 in the radial direction. The number of shaft through-holes 111 may be singular or plural. When the motor shaft 10 rotates, the fluid F inside the motor shaft 10 flows out of the rotor shaft 11 through the shaft through-hole 111 by centrifugal force. Note that the above-described example does not exclude a configuration in which the shaft through-hole 111 and a rotor through-hole 2111 (to be described later) are omitted.

The motor shaft 10 has an inlet 121. The inlet 121 is an opening in an end portion of the motor shaft 10 which is located on the −Y direction side and is an opening in an end portion of the gear shaft 12 (to be described later) which is located on the −Y direction side in the present embodiment. The inlet 121 is connected to a flow path 464 of a gear lid portion 46 described later. The fluid F flows into the motor shaft 10 from the flow path 464 through the inlet 121.

The motor shaft 10 further includes a shaft wall portion 13. The shaft wall portion 13 is disposed inside the rotor shaft 11 on the +Y direction side and expands in the radial direction. A radially outer end portion of the shaft wall portion 13 is connected to an inner surface of the rotor shaft 11. The shaft wall portion 13 is disposed in the +Y direction with respect to the shaft through-hole 111 and closes the opening of the end portion the rotor shaft 11 which is located on the +Y direction side. The shaft wall portion 13 may be integrated with the rotor shaft 11 or may be separated from the rotor shaft 11.

The rotor 21 is rotatable together with the motor shaft 10 about the rotation axis J1. As described above, the motor 1 includes the rotor 21. In other words, the drive apparatus 100 includes the rotor 21. The rotor 21 is fixed to the motor shaft 10. The rotor 21 rotates when electric power is supplied from the inverter of the drive apparatus 100 to the stator 22. The rotor 21 includes a rotor core 211 and a magnet 212. The rotor core 211 is a magnetic body and is formed by, for example, stacking thin electromagnetic steel plates in the Y-axis direction. The rotor core 211 is fixed to the radially outer surface of the rotor shaft 11. A plurality of the magnets 212 are fixed to the rotor core 211. The plurality of magnets 212 are arranged along the circumferential direction with magnetic poles arranged alternately.

In addition, the rotor core 211 has the rotor through-hole 2111. The rotor through-hole 2111 penetrates the rotor core 211 in the Y-axis direction and is connected to the shaft through-hole 111. The rotor through-hole 2111 is used as a passage through which the fluid F also functioning as a refrigerant flows. When the rotor 21 rotates, the fluid F flowing through the inside of the motor shaft 10 can flow into the rotor through-hole 2111 via the shaft through-hole 111. In addition, the fluid F flowing into the rotor through-hole 2111 can flow out from both end portions of the rotor through-hole 2111 in the Y-axis direction to the outside. The fluid F having flowed out flies toward the stator 22 and cools, for example, a coil portion 222 (particularly, a coil end 2221 thereof) to be described later and the like. In addition, the flowed fluid F flies toward a first motor bearing 4211, a second motor bearing 4331, and the like that rotatably support the motor shaft 10, and lubricates and cools the bearings.

The stator 22 faces the rotor 21 with a gap therebetween in the radial direction. As described above, the motor 1 includes the stator 22. In other words, the drive apparatus 100 includes the stator 22. The stator 22 is arranged radially outward of the rotor 21. The stator 22 faces the rotor 21 with a gap therebetween in the radial direction. The stator 22 includes a stator core 221 and the coil portion 222. The stator 22 is held by a first housing tubular portion 41 to be described later. The stator core 221 has a plurality of magnetic pole teeth (not shown) extending radially inward from an inner surface of an annular yoke (not shown). The coil portion 222 is formed by winding a conductive wire around the magnetic pole teeth via an insulator (not illustrated). The conductive wire of the coil portion 222 is connected to the inverter through the bus bar 223 (see FIG. 3). The coil portion 222 has the coil end 2221 protruding from the end surface of the stator core 221 in the Y-axis direction Next, the gear portion 3 is connected to the −Y direction side of the motor shaft 10 and is connected to the gear shaft 12 in the present embodiment. The gear portion 3 is a power transmission device that transmits power of the motor 1 to a drive shaft Ds to be described later. The gear portion 3 includes a deceleration device 31 and a differential device 32.

The deceleration device 31 is connected to the gear shaft 12. The deceleration device 31 is arranged to increase the torque outputted from the motor 1 in accordance with a reduction ratio while reducing the rotation speed of the motor 1. The deceleration device 31 transmits the torque output from the motor 1 to the differential device 32. The deceleration device 31 includes a first gear 311, a second gear 312, a third gear 313, and an intermediate shaft 314.

The first gear 311 is fixed to the radially outer surface of the motor shaft 10 on the −Y direction side of the motor shaft 10. The gear portion 3 includes the first gear 311. For example, the first gear 311 is disposed on the radially outer surface of the gear shaft 12. The first gear 311 may be integrated with the gear shaft 12 or may be separated from the gear shaft 12 and firmly fixed to the radially outer surface of the gear shaft 12. The first gear 311 is rotatable about the rotation axis J1 together with the motor shaft 10.

The intermediate shaft 314 extends along an intermediate axis J2 and is rotatable about the intermediate axis J2. The intermediate axis J2 extends in the Y-axis direction. The gear portion 3 includes the intermediate shaft 314. Both ends of the intermediate shaft 314 are supported by a first intermediate bearing 4231 and a second intermediate bearing 4621 to be rotatable about the intermediate axis J2.

The second gear 312 is fixed to the radially outer surface of the intermediate shaft 314 and meshes with the first gear 311. The third gear 313 is fixed to the radially outer surface of the intermediate shaft 314. The gear portion 3 includes the second gear 312 and the third gear 313. The third gear 313 is disposed in the +Y direction with respect to the second gear and meshes with a fourth gear 321 (to be described later) of the differential device 32. Each of the second gear 312 and the third gear 313 may be integrated with the intermediate shaft 314 or may be separated from the intermediate shaft 314 and firmly fixed to the radially outer surface of the intermediate shaft 314. The second gear 312 and the third gear 313 are rotatable about the intermediate axis J2 together with the intermediate shaft 314.

The torque of the motor shaft 10 is transmitted from the first gear 311 to the second gear 312. Then, the torque transmitted to the second gear 312 is transmitted to the third gear 313 via the intermediate shaft 314. Furthermore, the torque is transmitted from the third gear 313 to the fourth gear 321 of the differential device 32.

The differential device 32 is attached to the drive shaft Ds and transmits torque transmitted from the deceleration device 31 to the drive shaft Ds. The differential device 32 includes a fourth gear 321 that meshes with the third gear 313. The fourth gear 321 is a so-called ring gear. The torque of the fourth gear 321 is output to the drive shaft Ds.

The drive shaft Ds includes a first drive shaft Ds1 and a second drive shaft Ds2. The first drive shaft Ds1 is attached in the +Y direction side of the differential device 32. The second drive shaft Ds2 is attached in the −Y direction side of the differential device 32. For example, the differential device 32 transmits the torque to the drive shafts Ds1 and Ds2 on both the Y-axis sides while absorbing a rotation speed difference between the drive shafts Ds1 and Ds2 when the vehicle 300 turns.

The housing 4 accommodates the motor 1. More specifically, the housing 4 accommodates the motor shaft 10, the rotor 21, the stator 22, the gear portion 3, and the like. The housing 4 includes a first housing tubular portion 41, a side plate portion 42, a motor lid portion 43, a cover member 44, a second housing tubular portion 45, and a gear lid portion 46. Note that the first housing tubular portion 41, the side plate portion 42, the motor lid portion 43, the cover member 44, the second housing tubular portion 45, and the gear lid portion 46 are formed using, for example, a conductive material, and in the present embodiment, are formed using a metal material such as iron, aluminum, or an alloy thereof. In addition, these are preferably formed using the same material in order to suppress contact corrosion of dissimilar metals at the contact portion. However, the present invention is not limited to this example, and these may be formed using materials other than the metal materials, or at least a part of these may be formed using different materials.

The housing 4 further includes the motor housing 401 and a gear housing 402. These will be described later.

The first housing tubular portion 41 has a tubular shape extending in the Y-axis direction. The rotor shaft 11, the rotor 21, the stator 22, a fluid reservoir 54 (to be described later), and the like are arranged inside the first housing tubular portion 41. In addition, a stator core 221 is fixed to the inner surface of the first housing tubular portion 41.

The side plate portion 42 covers the end portion of the first housing tubular portion 41 which is located on the −Y direction side and covers the end portion of the second housing tubular portion 45 which is located on the +Y direction side. The side plate portion 42 expands in a direction intersecting the rotation axis J1 and divides the first housing tubular portion 41 from the second housing tubular portion 45. In the present embodiment, the first housing tubular portion 41 and the side plate portion 42 are integrated. As a result, the rigidity of these portions can be enhanced. However, the present invention is not limited to this example, and both may be separate bodies.

The side plate portion 42 has a side plate through-hole 4201 and a first drive shaft through-hole 4202. The side plate through-hole 4201 and the first drive shaft through-hole 4202 penetrates the side plate portion 42 in the Y-axis direction. The center of the side plate through-hole 4201 coincides with the rotation axis J1. The motor shaft 10 extends through the side plate through-hole 4201. The center of the first drive shaft through-hole 4202 coincides with a differential axis J3. The first drive shaft Ds1 extends through the first drive shaft through-hole 4202. An oil seal (not illustrated) for sealing between the first drive shaft Ds1 and the first drive shaft through-hole 4202 is arranged in a gap therebetween.

In addition, the side plate portion 42 further includes a first motor bearing holder 421, a first gear bearing holder 422, a first intermediate bearing holder 423, and a first drive bearing holder 424. The first motor bearing holder 421 is disposed on the +Y direction side of the inner surface of the side plate through-hole 4201 and holds a first motor bearing 4211. The first motor bearing 4211 rotatably supports the motor shaft 10. The motor 1 includes the first motor bearing 4211. Note that the first motor bearing 4211 is an example of a "first bearing" of the present invention, and is a ball bearing in the present embodiment. More specifically, the first motor bearing 4211 rotatably supports the end portion of the rotor shaft 11 which is located on the −Y direction side. The first gear bearing holder 422 is disposed on the −Y direction side of the inner surface of the side plate through-hole 4201 and holds a first gear bearing 4221. The first gear bearing 4221 rotatably supports the end portion of the gear shaft 12 which is located on the +Y direction side. The first intermediate bearing holder 423 is disposed on the end surface of the side plate portion 42 which is located on the −Y direction side and holds the first intermediate bearing 4231. The first intermediate bearing 4231 rotatably supports the end portion of the intermediate shaft 314 which is located on the +Y direction side. The first drive bearing holder 424 is disposed on the inner surface of the first drive shaft through-hole 4202 and holds the first drive bearing 4241. The first drive bearing 4241 rotatably supports the first drive shaft Ds1.

The motor lid portion 43 extends in a direction intersecting the rotation axis J1 and covers the end portion of the first housing tubular portion 41 in the +Y direction. The motor lid portion 43 can be fixed to the first housing tubular portion 41 by, for example, a screw, but is not limited thereto, and a method of firmly fixing the motor lid portion 43 to the first housing tubular portion 41, such as screwing or press-fitting, can be widely adopted. As a result, the motor lid portion 43 can be brought into close contact with the end portion of the first housing tubular portion 41 which is located on the +Y direction-side. Note that the term "close contact" means to have such a sealing property to an extent that the fluid F inside the members does not leak to the outside and to an extent that foreign matter such as external water, dirt, or dust does not enter. It is assumed that the same is applied below for the close contact.

The motor lid portion 43 includes a plate portion 431, a wall portion 432, and a second motor bearing holder 433. The plate portion 431 extends in a direction intersecting the rotation axis J1 and is attached to the end portion of the first housing tubular portion 41 which is located in the +Y direction. The wall portion 432 protrudes in the +Y direction from the end surface of the plate portion 431 which is located on the +Y direction side and expands in the circumferential direction. The wall portion 432 surrounds the rotation axis J1, the end portion of the rotor shaft 11 which is located on the +Y direction-side, an opening portion 4332, the conductive member 8, and the like. The second motor bearing holder 433 holds the second motor bearing 4331. The second motor bearing 4331 rotatably supports the motor shaft 10. The motor 1 includes the second motor bearing 4331. Note that the second motor bearing 4331 is another example of the "first bearing" in the present invention and is a ball bearing in the present embodiment. More specifically, the second motor bearing 4331 rotatably supports the end portion of the rotor shaft 11 which is located on the +Y direction side. The second motor bearing holder 433 has an opening portion 4332. The opening portion 4332 penetrates the plate portion 431 in the Y-axis direction and surrounds the rotation axis J1 when viewed from the Y-axis direction. The rotor shaft 11 extends through the opening portion 4332.

The motor lid portion 43 further includes a first contact surface 4341 and a second contact surface 4342 (see, for example, FIG. 3). The first contact surface 4341 and the second contact surface 4342 are arranged at the end portion of the plate portion 431 which is located on the +Y direction side and are in contact with the fixed portion 82 (to be described later) of the conductive member 8 which is fixed to the motor lid portion 43. The first contact surface 4341 and the second contact surface 4342 will be described later.

The cover member 44 is attached to the motor lid portion 43 and covers the end portion of the wall portion 432 which is located on the +Y direction side. The cover member 44 can be attached to the motor lid portion 43 by, for example, screwing, but is not limited thereto, and a method of firmly fixing the cover member 44 to the motor lid portion 43, such as screwing or press-fitting, can be widely adopted.

The second housing tubular portion 45 has a tubular shape surrounding the gear portion 3 and extends in the Y-axis direction. The end portion of the second housing tubular portion 45 which is located on the +Y direction side is connected to the side plate portion 42 and covered with the side plate portion 42. In the present embodiment, the second housing tubular portion 45 is attached to the end portion of the side plate portion 42 which is located on the −Y direction side. In addition, the second housing tubular portion 45 can be attached to the side plate portion 42 by, for example, fixing with a screw, but is not limited thereto, and a method of firmly fixing the second housing tubular portion 45 to the side plate portion 42, such as screwing or press-fitting, can be widely adopted. As a result, the second housing tubular portion 45 can be brought into close contact with the end portion of the side plate portion 42 which is located on the −Y direction side.

The gear lid portion 46 expands in a direction intersecting the rotation axis J1. In the present embodiment, the second housing tubular portion 45 and the gear lid portion 46 are integrated. However, the present invention is not limited to this example, and both may be separate bodies.

The gear lid portion 46 includes a second drive shaft through-hole 460. The second drive shaft through-hole 460 penetrates the gear lid portion 46 in the Y-axis direction. The center of the second drive shaft through-hole 460 coincides with the differential axis J3. The second drive shaft Ds2 extends through the second drive shaft through-hole 460. An oil seal (not illustrated) is disposed in a gap between the second drive shaft Ds2 and the second drive shaft through-hole 460.

The gear lid portion 46 further includes a second gear bearing holder 461, a second intermediate bearing holder 462, and a second drive bearing holder 463. The second gear bearing holder 461 and the second intermediate bearing holder 462 are arranged on the end surface of the gear lid portion 46 which is located on the +Y direction side. The second gear bearing holder 461 holds a second gear bearing 4611. The second gear bearing 4611 rotatably supports the end portion of the gear shaft 12 which is located on the −Y direction side. The second intermediate bearing holder 462 holds the second intermediate bearing 4621. The second intermediate bearing 4621 rotatably supports the end portion of the intermediate shaft 314 which is located on the −Y direction side. The second drive bearing holder 463 is disposed on the inner surface of the second drive shaft through-hole 460 and holds a second drive bearing 4631. The second drive bearing 4631 rotatably supports the second drive shaft Ds2.

The gear lid portion 46 has a flow path 464. The flow path 464 is a passage for the fluid F and connects a tray portion 465 and the inlet 121 of the motor shaft 10. The tray portion 465 has a recess portion recessed in the −Z direction. The tray portion 465 can store the fluid F scraped up by the gear (for example, the fourth gear 321) of the gear portion 3. In the present embodiment, the gear lid portion 46 has the tray portion 465. The tray portion 465 is disposed on the end surface of the gear lid portion 46 which is located on the +Y direction side and extends in the +Y direction. The fluid F stored in the tray portion 465 is supplied to the flow path 464 and flows into the motor shaft 10 from the inlet 121 at the end portion of the motor shaft 10 which is located on the −Y direction side.

The motor housing 401 includes a first motor bearing holder 421 that holds the first motor bearing 4211 and a second motor bearing holder 433 that holds the second motor bearing 4331 and accommodates the rotor 21 and the stator 22. The motor 1 includes the motor housing 401. The motor housing 401 accommodates the rotor shaft 11 and the like. In the present embodiment, the motor housing 401 includes the first housing tubular portion 41, the side plate portion 42, the motor lid portion 43, and the cover member 44.

The motor housing 401 includes an accommodation space 4011. The accommodation space 4011 houses the end portion of the rotor shaft 11 which is located on the +Y direction side, the detector 7, the conductive member 8, and the like. In the present embodiment, the accommodation space 4011 includes the plate portion 431, the wall portion 432, and the cover member 44.

The gear housing 402 accommodates the gear shaft 12, the gear portion 3, and the like. In the present embodiment, the gear housing 402 includes the side plate portion 42, the second housing tubular portion 45, and the gear lid portion 46.

A fluid storing portion P in which the fluid F is accumulated is disposed in a lower portion of the gear housing 402. A part of the gear portion 3 (for example, the fourth gear 321) is immersed in the fluid storing portion P. The fluid F accumulated in the fluid storing portion P is scraped up by the operation of the gear portion 3 and supplied to the inside of the gear housing 402. For example, the fluid F is scraped up by the tooth surface of the fourth gear 321 when the fourth gear 321 of the differential device 32 rotates. A part of the scraped fluid F is supplied to the gears and the bearings of the deceleration device 31 and the differential device 32 in the gear housing 402 and used for lubrication. In addition, other part of the scraped fluid F is stored in the tray portion 465, supplied to the inside of the motor shaft 10, supplied to the rotor 21 and the stator 22 of the motor 1 and the bearings in the gear housing 402, and used for cooling and lubrication.

The fluid circulation portion 5 will be described next. The fluid circulation portion 5 includes a pipe portion 51, a pump 52, a heat exchanger 53, and a fluid reservoir 54.

The pipe portion 51 connects the pump 52 and the fluid reservoir 54 disposed inside the first housing tubular portion 41. The pump 52 sucks the fluid F stored in the fluid storing portion P and supplies the fluid F to the fluid reservoir 54. The pump 52 is an electric pump in the present embodiment.

The heat exchanger 53 is disposed between the pump 52 and the fluid reservoir 54 in the pipe portion 51. That is, the fluid F sucked by the pump 52 passes through the heat exchanger 53 via the pipe portion 51 and then is sent to the fluid reservoir 54. A refrigerant is supplied to the heat exchanger 53 from a flow path different from the pipe portion 51. In the heat exchanger 53, the fluid F for cooling the motor 1 can exchange heat with the refrigerant. The drive apparatus 100 includes the heat exchanger 53. The temperature of the fluid F can be lowered by heat exchange between the two fluids.

The fluid reservoir 54 is a tray disposed vertically above the stator 22 inside the motor housing 401. A dropping hole (whose reference sign is omitted) is formed at a bottom of the fluid reservoir 54, and the motor 1 is cooled by dropping the fluid F from the dropping hole. The dropping hole is formed above the coil end 2221 of the coil portion 222 of the stator 22, for example, and the coil portion 222 is cooled by the fluid F.

Next, the conductive bearing 6 will be described. The conductive bearing 6 is disposed inside the motor shaft 10 at the end portion of the motor shaft 10 which is located on the +Y direction side. The motor 1 includes the conductive bearing 6. Note that the conductive bearing 6 is an example of the "second bearing" in the present invention and is a ball bearing in the present embodiment. In the present embodiment, the conductive bearing 6 is fitted inside the end portion of the rotor shaft 11 which is located on the +Y direction side. For example, a radially outer end portion of the conductive bearing 6 (for example, an outer ring 63 of the ball bearing) is in contact with the inner peripheral surface of the motor shaft 10 (in particular, the rotor shaft 11). Note that the conductive bearing 6 may be fixed in the rotor shaft 11 by means other than the fitting structure as described above (for example, welding or brazing).

The conductive bearing 6 has lower electric resistance than the first motor bearing 4211 and the second motor bearing 4331. The conductive bearing 6 is lubricated by a lubricant 61 having a higher electrical conductivity than the fluid F. In the present embodiment, conductive grease is used as the lubricant 61. In the conductive grease, a conductive material such as copper powder or carbon powder is added to a lubricating oil such as grease. The conductive bearing 6 can electrically connect the inner ring 62 and the outer ring 63 of the conductive bearing 6 with the lubricant 61. Therefore, the rotor shaft 11 of the motor shaft 10 is electrically connected to the motor housing 401.

The detector 7 will be described next. As illustrated in FIGS. 1, 3, and 4, the detector 7 is attached to the +Y direction side of the motor lid portion 43. The detector 7 is disposed radially outward of the motor shaft 10 and detects the rotation angle of the motor shaft 10. The motor 1 includes the detector 7. In the present embodiment, the detector 7 is a resolver including a resolver rotor and a resolver stator. The detector 7 includes a resolver rotor (not illustrated) fixed to the rotor shaft 11 and a resolver stator (not illustrated) fixed to the plate portion 431 of the motor lid portion 43. The resolver rotor and the resolver stator have an annular shape. The inner peripheral surface of the resolver stator radially faces the outer peripheral surface of the resolver rotor. The resolver stator periodically detects a rotation angle position of the resolver rotor when the rotor 21 rotates. As a result, the detector 7 acquires information on the rotation angle position of the rotor 21. Note that the present invention is not limited to the example of the present embodiment, and the detector 7 is not necessarily the resolver, and may be, for example, a rotary encoder or the like.

The conductive member 8 will be described next with reference to FIGS. 1, 3, and 4. The conductive member 8 electrically connects the conductive bearing 6 to the motor housing 401. The conductive member 8 is accommodated in the motor housing 401. The motor 1 includes the conductive member 8. The conductive member 8 is disposed, for example, between the motor lid portion 43 and the cover member 44 and, more specifically, is accommodated in the accommodation space 4011.

The conductive member 8 includes a contact portion 81, a fixed portion 82, and a bridge portion 83. The contact portion 81 is in contact with the radially inner end portion of the conductive bearing 6. The fixed portion 82 is fixed to the motor housing 401 radially outward of the motor shaft 10. The bridge portion 83 connects the contact portion 81 and the fixed portion 82. Thus, the conductive bearing 6 in contact with the inner peripheral surface of the motor shaft 10 is electrically connected to the motor housing 401 with the conductive member 8. Accordingly, the current generated by the potential variation generated in the motor shaft 10 can be discharged to the motor housing 401 through the conductive bearing 6 and the conductive member 8. Further, the fixed portion 82 of the conductive member 8 for neutralizing the motor shaft 10 is fixed to the motor housing 401 radially outward of the motor shaft 10. Therefore, the conductive member 8 can be more easily attached to the motor housing 401.

In the present embodiment, the fixed portion 82 and the bridge portion 83 each are singular, but are not limited to this example, and may be plural. For example, the fixed portion 82 and the bridge portion 83 may be disposed in the circumferential direction, and the radially inner end portion of each bridge portion 83 may be connected to one contact portion.

The contact portion 81 is disposed on the −Y direction side of the radially inner end portion of the bridge portion 83 and is electrically connected to the conductive bearing 6. The contact portion 81 includes a wall portion 811 and a hook portion 812. The wall portion 811 extends in the −Y direction from the radially inner end portion of the bridge portion 83. The radially outer end portion of the wall portion 811 is in contact with the inner ring 62 of the conductive bearing 6. A first recess 8111 is disposed in the wall portion 811. The first recess 8111 is recessed radially inward from the radially outer surface of the wall portion 811. In other words, the contact portion 81 further includes the first recess 8111 recessed radially inward. The radially inner end portion of the conductive bearing 6 is fitted in the first recess 8111. This makes it difficult for the contact portion 81 to move in the Y-axis direction with respect to the conductive bearing 6. Therefore, the contact of the contact portion 81 with the conductive bearing 6 can be stably maintained. The inner side surface of the first recess 8111 can also contact a part of the end surface of the conductive bearing 6 in the Y-axis direction.

Therefore, the contact area of the contact portion 81 with respect to the conductive bearing 6 can be further increased. Therefore, the electrical conductivity between the both can be improved.

For example, as illustrated in FIG. 4, the hook portion 812 extends from the end portion of the wall portion 811 which is located on the −Y direction side and is bent so as to protrude in the −Y direction. A distal end 8121 of the hook portion 812 contacts a radially inner end (for example, the inner ring 62) of the conductive bearing 6.

Preferably, at least a part of the contact portion 81 extends in the circumferential direction along the radially inner surface of the conductive bearing 6. For example, at least one of the wall portion 811 and the distal end 8121 of the hook portion 812 extends circumferentially along the inner ring 62 of the conductive bearing 6. With such a configuration, the above-mentioned portion is brought into surface contact with the radially inner surface of the conductive bearing 6 (in particular, the inner ring 62 thereof) and, hence the contact area between the above-mentioned portion and the conductive bearing 6 can be further widened. Therefore, the electrical conductivity between the conductive bearing 6 and the conductive member 8 can be further improved. However, this example does not exclude a configuration in which at least a part of the contact portion 81 does not extend in the circumferential direction along the radially inner surface of the conductive bearing 6. For example, at least one of the wall portion 811 and the distal end 8121 of the hook portion 812 may be in point or line contact with the inner ring 62 of the conductive bearing 6.

A part of the portion of the contact portion 81 which is in contact with the conductive bearing 6 faces the other part of the above-described portion in a direction perpendicular to the rotation axis J1 with the rotation axis J1 interposed therebetween. For example, referring to FIG. 4, a direction perpendicular to the drawing is referred to as a "first direction D1", and a vertical direction of the drawing is referred to as a "second direction D2". In addition, a direction from the lower side to the upper side in the drawing is defined as "+D2 direction" as one direction of the second direction. A direction from the upper side to the lower side in the drawing is defined as a "−D2 direction" as the other direction of the second direction. As illustrated in FIG. 4, when viewed from the first direction D1, a part of the portion of the contact portion 81 which is in contact with the conductive bearing 6 is disposed on one side of the rotation axis J1 in the second direction D2. The first direction D1 is a direction perpendicular to the Y-axis direction. The second direction D2 is a direction perpendicular to the Y-axis direction and the first direction D1. When viewed from the first direction D1, the other part of the portion of the contact portion 81 which is in contact with the conductive bearing 6 is disposed on the other side of the rotation axis J1 in the second direction D2. More specifically, as viewed in the X-axis direction, at least a part of the wall portion 811 is disposed in the +D2 direction with respect to the rotation axis J1 and faces the distal end 8121 of the hook portion 812 in a direction perpendicular to the rotation axis J1. When viewed from the X-axis direction, the distal end 8121 of the hook portion 812 is disposed in the −D2 direction with respect to the rotation axis J1. By disposing the portion of the contact portion 81 which is in contact with the conductive bearing 6 as described above, the contact portion 81 can more stably contact the radially inner end portion of the conductive bearing 6. For example, by bringing these portions into contact with each other at a rotationally symmetric position in the circumferential direction, the rattling of the contact portion 81 with respect to the conductive bearing 6 in the radial direction can be prevented.

In the present embodiment, the contact portion 81 is integrated with the bridge portion 83. However, the present invention is not limited to the example of the present embodiment, and the contact portion 81 may be separated from the bridge portion 83. For example, the contact portion 81 may be connected to the radially inner end portion of the bridge portion 83 by the fitting structure constituted by a recess disposed in one of the contact portion 81 and the bridge portion 83 and a protrusion disposed on the other thereof (see, for example, FIGS. 5 and 6 according to a modification described later). Thus, the conductive member 8 can be more easily manufactured as compared with a configuration in which both are integrated.

In the present embodiment, the fixed portion 82 is fixed to the motor lid portion 43. Note that the fixed portion 82 is not limited to the example of the present embodiment and may be fixed to the cover member 44. In this case, the first contact surface 4341 and the second contact surface 4342 are disposed on the cover member 44.

Preferably, the first contact surface 4341 is in contact with the circumferential end surface of the fixed portion 82. The motor housing 401 has the first contact surface 4341. The first contact surface 4341 extends along the circumferential end surface of the fixed portion 82 and expands at least in the Y-axis direction. In the present embodiment, the first contact surface 4341 is disposed on only one side of the fixed portion 82 which is located in the circumferential direction and is in contact with only one end surface of the fixed portion 82 which is located in the circumferential direction. However, the present invention is not limited to this example, and the first contact surface 4341 may be disposed on both sides of the fixed portion 82 in the circumferential direction and may be in contact with both one end surface and the other end surface of the fixed portion 82 which are located in the circumferential direction. When the fixed portion 82 is attached to the motor housing 401 by the contact of the first contact surface 4341, the circumferential position of the fixed portion 82 can be easily determined by the first contact surface 4341. Furthermore, the first contact surface 4341 can prevent the movement of the fixed portion 82 in the circumferential direction. However, the above-described example does not exclude a configuration in which the first contact surface 4341 does not contact the circumferential end surface of the fixed portion 82. In this configuration, the first contact surface 4341 may not be disposed in the motor housing 401.

Preferably, the second contact surface 4342 is in contact with the radially inner end surface of the fixed portion 82. The motor housing 401 has the second contact surface 4342. The second contact surface 4342 extends along the radially inner end surface of the fixed portion 82 and expands at least in the Y-axis direction. When the fixed portion 82 is attached to the motor housing 401 by the contact of the second contact surface 4342, the radial position of the fixed portion 82 can be easily determined by the second contact surface 4342. Furthermore, the second contact surface 4342 can prevent the movement of the fixed portion 82 in the radial direction. However, the above-described example does not exclude a configuration in which the second contact surface 4342 does not contact the radially inner end surface of the fixed portion 82. In this configuration, the second contact surface 4342 may not be disposed in the motor housing 401.

In addition, the motor housing 401 may have a third contact surface (not illustrated) that extends along the radially outer end surface of the fixed portion 82 and is in contact with the radially outer end surface of the fixed portion 82.

Preferably, the fixed portion 82 is disposed in the −Y direction with respect to the end portion of the motor shaft 10 which is located on the +Y direction side. Accordingly, since the conductive member 8 can be disposed further in the −Y direction, the increase in the size of the motor 1 in the Y-axis direction can be more effectively suppressed or prevented.

Preferably, fixed portion 82 is disposed at a position away from bus bar 223 of stator 22. In this way, the bus bar 223 is less likely to be an obstacle when the fixed portion 82 is attached. Therefore, the attachment workability of the fixed portion 82 can be improved.

The bridge portion 83 has a plate shape extending in a direction intersecting the Y-axis direction. Preferably, a width Wy of the bridge portion 83 in the Y-axis direction is smaller than the circumferential width of the bridge portion 83. The width Wy is an example of the "axial width" in the present invention. In this way, since the bridge portion 83 can be made thinner, it is possible to suppress or prevent an increase in the size of the motor 1 in the Y-axis direction due to the arrangement of the conductive member 8. However, this example does not exclude a configuration in which the width Wy of the bridge portion 83 in the Y-axis direction is equal to or larger than the circumferential width of the bridge portion 83.

Preferably, the bridge portion 83 has flexibility in the Y-axis direction. With such a configuration, the vibration of the motor shaft 10 in the Y-axis direction can be alleviated by the bridge portion 83. Thus, the conductive member 8 can stably maintain the connection between the conductive bearing 6 and the contact portion 81. However, this example does not exclude a configuration in which the bridge portion 83 has high rigidity and low flexibility.

In the present embodiment, a first circumferential width Wr1 of the radially outer end portion of the bridge portion 83 is larger than a second circumferential width Wr2 of the radially inner end portion of the bridge portion 83. The circumferential width of the bridge portion 83 may discontinuously change in the radial direction or may continuously change in the radial direction. For example, in the latter case, the circumferential width of the bridge portion 83 may gradually increase toward the radial outside. In this way, the circumferential width Wr1 of the bridge portion 83 on the fixed portion 82 side in the radial direction can be further widened. Therefore, the connection strength between the fixed portion 82 and the bridge portion 83 can be improved. Furthermore, vibration transmitted from the bridge portion 83 to the fixed portion 82 can be further reduced. However, this example does not exclude the configuration in which Wr1≤Wr2.

The bridge portion 83 includes a support portion 831 and an extending portion 832. The support portion 831 extends in the +Y direction from the radially inner end portion of the fixed portion 82. The extending portion 832 has a plate shape extending at least in the radial direction and extending in a direction intersecting the Y-axis direction in the present embodiment. The radially inner end portion of the extending portion 832 is connected to the contact portion 81.

The bridge portion 83 further includes a bent portion 833 bent in the Y-axis direction. In the present embodiment, the bent portion 833 has a zigzag shape when viewed from the circumferential direction and includes at least one mountain fold portion and at least one valley fold portion. In this case, the mountain fold portion is a portion where the +Y-direction side end portions of two planes diagonally intersecting both the Y-axis direction and the radial direction are directly connected to each other and has a V-shape protruding in the +Y direction when viewed from the circumferential direction. The valley fold portion is a portion where the −Y-direction side end portions of two planes diagonally intersecting both the Y-axis direction and the radial direction are directly connected to each other and has a V-shape protruding in the −Y direction when viewed from the circumferential direction. However, the present invention is not limited to this example, and at least one of the mountain fold portion and the valley fold portion may be a portion in which the Y-axis direction one side end portions of two planes obliquely intersecting the Y-axis direction are connected to each other through a curved surface, and for example, may have a U shape when viewed from the circumferential direction. The bent portion 833 is disposed between the support portion 831 and the extending portion 832. The radially outer end portion of the bent portion 833 is connected to the end portion of the support portion 831 which is located on the +Y direction side. The radially inner end portion of the bent portion 833 is connected to the radially outer end portion of the extending portion 832. The bent portion 833 has large elasticity particularly in the Y-axis direction. Depending on the arrangement of the bent portion 833, the bridge portion 83 can be bent in the Y-axis direction more than other portions of the bent portion 833. Accordingly, the vibration of the motor shaft 10 in the Y-axis direction can be further reduced. Therefore, the conductive member 8 can more stably maintain the connection between the conductive bearing 6 and the contact portion 81.

The bent portion 833 is disposed radially outward of the rotor shaft 11 and is preferably disposed radially outward of the second motor bearing holder 433. In this way, it is not necessary to secure a space for disposing the bent portion 833 having a larger size in the Y-axis direction than the extending portion 832 on the +Y direction side with respect to the rotor shaft 11 or the second motor bearing holder 433. Therefore, since the bent portion 833 can be arranged compactly, it is possible to suppress or prevent an increase in size of the motor 1.

Figure 5:
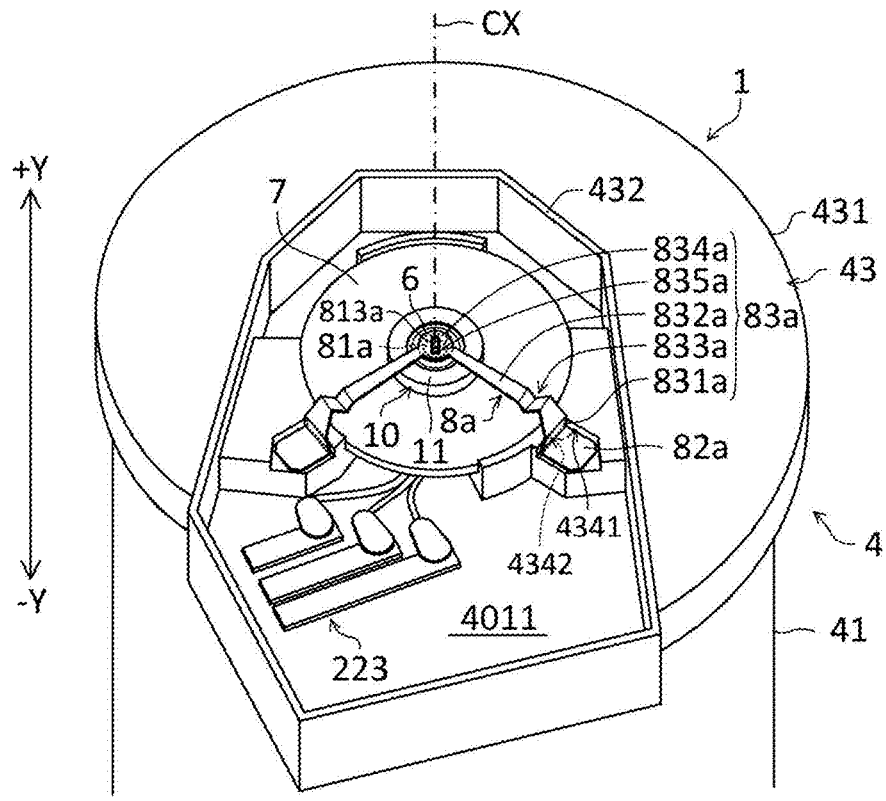
FIG. 5 is a perspective view of the drive apparatus on the +Y direction side according to a modification.
Figure 6:
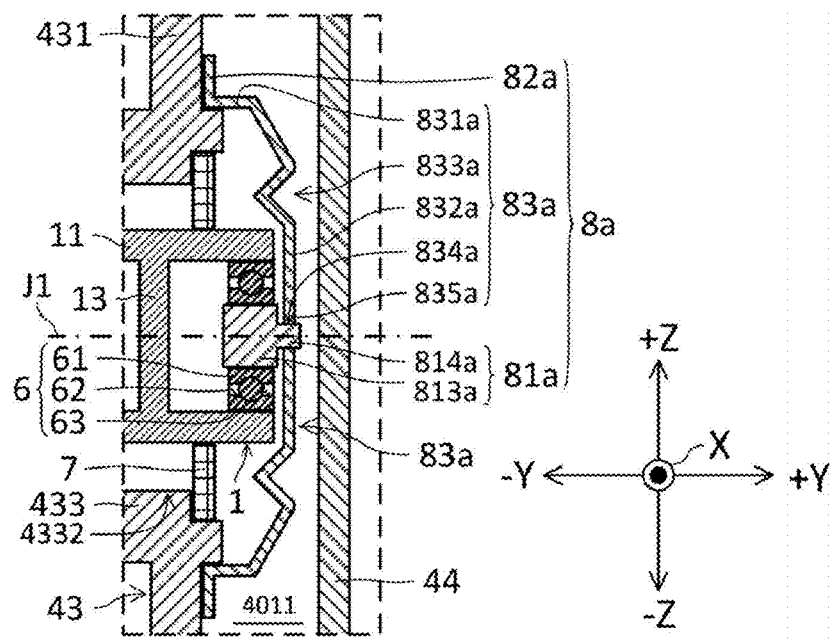
FIG. 6 is a conceptual sectional view of the main part of the drive apparatus according to the modification.

A modification of the embodiment will be described next with reference to FIGS. 5 and 6. FIG. 5 is a perspective view of the drive apparatus 100 on the +Y direction side according to a modification. FIG. 6 is a conceptual sectional view of the main part of the drive apparatus 100 according to the modification. Note that FIGS. 5 and 6 are merely conceptual diagrams, and a layout and a dimension of each portion are not necessarily identical to those of the actual drive apparatus 100 in a strict sense. FIG. 6 corresponds to, for example, a portion IV surrounded by the broken line in FIG. 1. Hereinafter, the configurations different from the above-described embodiment will be described. In addition, the same components as those in the above-described embodiment are denoted by the same reference signs, and the description thereof may be omitted.

In the modification, a contact portion 81a of a conductive member 8a is a member different from a bridge portion 83a. Thus, the conductive member 8a can be more easily manufactured as compared with a configuration in which both are integrated. However, this example does not exclude a configuration in which the contact portion 81a is integrated with the bridge portion 83a.

In the modification, the contact portion 81a includes a pillar portion 813a and a protrusion 814a. The pillar portion 813a is a solid member and extends along the rotation axis J1. The protrusion 814a protrudes in the +Y direction from the end portion of the pillar portion 813a which is located on the +Y direction side. The radially outer surface of the pillar portion 813a is in contact with the radially inner surface of the conductive bearing 6 (particularly, the inner ring 62) over the entire region in the circumferential direction around the rotation axis J1. However, the present invention is not limited to this example, and the pillar portion 813a may have a cylindrical shape extending along the rotation axis J1. In addition, the above-described example does not exclude a configuration in which the radially outer surface of the pillar portion 813a does not come into contact with the radially inner surface of the conductive bearing 6 (particularly, the inner ring 62) in a partial region in the circumferential direction around the rotation axis J1.

A plurality of fixed portions 82a and a plurality of bridge portions 83a of the conductive member 8a are arranged in the circumferential direction. Although the number of the fixed portions 82a and the number of the bridge portions 83a are two in FIGS. 5 and 6, each of the numbers is not limited to this example and may be one or a plurality of three or more.

The bridge portion 83a further includes an attachment portion 834a in addition to the support portion 831a, the extending portion 832a, and the bent portion 833a. The attachment portion 834a has a plate shape extending in a direction intersecting the rotation axis J1 and is connected to the radially inner end portion of each bridge portion 83a. For example, the radially outer end portion of the attachment portion 834a is connected to the radially inner end portion of each extending portion 832a.

The contact portion 81a is connected to the attachment portion 834a. For example, the bridge portion 83a has a second recess 835a. The second recess 835a is disposed at the radially inner end portion of the bridge portion 83a and is disposed in the attachment portion 834 in FIGS. 5 and 6. The second recess 835a is disposed in the end surface of the attachment portion 834 which is located on the −Y direction side and is recessed in the +Y direction. However, the present invention is not limited to the examples in FIGS. 5 and 6, and the second recess 835a may be a through-hole penetrating the attachment portion 834 in the Y-axis direction. The protrusion 814a of the contact portion 81a is fitted in the second recess 835a. With this fitting structure, the contact portion 81a is connected to the bridge portion 83a.

Note that the present invention is not limited to the examples in FIGS. 5 and 6, and the protrusion 814a may be disposed on the bridge portion 83a, and the second recess 835a in which the protrusion 814a is fitted may be disposed in the contact portion 81a. That is, one of the contact portion 81a and the bridge portion 83a may have the second recess 835a. The other of the contact portion 81a and the bridge portion 83a may have the protrusion 814a. The second recess 835a is recessed toward one of the above portions from the other of the above portions in the Y-axis direction. The protrusion 814a protrudes toward one of the above portions from the other of the above portions in the Y-axis direction and is fitted in the second recess 835a at the radially inner end portion of the bridge portion 83a. This makes it possible to connect the contact portion 81a to the radially inner end portion of the bridge portion 83a with a simple configuration by fitting the second recess 835a and the protrusion 814a.

The embodiment of the present invention has been described above. Note that the scope of the present invention is not limited to the above-described embodiment. The present invention can be implemented by making various modifications to the above-described embodiment within a range not departing from the gist of the invention. In addition, the matters described in the above-described embodiments are arbitrarily combined together as appropriate within a range where no inconsistency occurs.

In the present embodiment and the modification, the present invention is applied to the in-vehicle drive apparatus 100. However, the present invention is not limited to this example, and the present invention is also applicable to drive apparatuses or the like used for applications other than in-vehicle applications.

The present invention is useful, for example, for an apparatus in which there is a possibility that a potential variation occurs in a motor shaft.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a tubular motor shaft extending in an axial direction along a rotation axis;
   a rotor rotatable together with the motor shaft about the rotation axis;
   a stator facing the rotor with a gap therebetween in a radial direction;
   a first bearing that rotatably supports the motor shaft;
   a motor housing having a bearing holder that holds the first bearing and accommodating the rotor and the stator;
   a second bearing disposed inside the motor shaft at one axial end portion of the motor shaft and having electric resistance lower than electric resistance of the first bearing; and
   a conductive member electrically connecting the second bearing to the motor housing,
   wherein a radially outer end portion of the second bearing is in contact with an inner peripheral surface of the motor shaft, and
   the conductive member includes a contact portion in contact with a radially inner end portion of the second bearing, a fixed portion fixed to the motor housing radially outward of the motor shaft, and a bridge portion connecting the contact portion and the fixed portion.

2. The motor according to claim 1, wherein
   the bridge portion has a plate shape extending in a direction intersecting the axial direction, and
   an axial width of the bridge portion is smaller than a circumferential width of the bridge portion.

3. The motor according to claim 1, wherein the bridge portion has flexibility in the axial direction.

4. The motor according to claim 1, wherein the motor housing has a first contact surface that extends along a circumferential end surface of the fixed portion and is in contact with the circumferential end surface of the fixed portion.

5. The motor according to claim 1, wherein the motor housing has a second contact surface that extends along a radially inner end surface of the fixed portion and is in contact with the radially inner end surface of the fixed portion.

6. The motor according to claim 1, wherein a first circumferential width of the bridge portion at a radially outer end portion is larger than a second circumferential width at a radially inner end portion of the bridge portion.

7. The motor according to claim 1, wherein the bridge portion has a bent portion bent in the axial direction.

8. The motor according to claim 1, wherein
   the contact portion includes a first recess recessed radially inward, and
   a radially inner end portion of the second bearing is fitted in the first recess.

9. The motor according to claim 1, wherein when viewed from a first direction perpendicular to the axial direction, a part of a portion of the contact portion which is in contact with the second bearing is disposed on one side of the rotation axis in a second direction perpendicular to the axial direction and the first direction, and the other part of the portion of the contact portion which is in contact with the second bearing is disposed on the other side of the rotation axis in the second direction.

10. The motor according to claim 1, wherein at least a part of the contact portion extends in a circumferential direction along a radially inner surface of the second bearing.

11. The motor according to claim 1, wherein the contact portion is a member separate from the bridge portion.

12. The motor according to claim 11, wherein
    one of the contact portion and the bridge portion has a second recess,
    the other of the contact portion and the bridge portion has a protrusion,
    the second recess is recessed toward the one from the other in the axial direction, and
    the protrusion protrudes toward the one from the other in the axial direction and is fitted in the second recess at a radially inner end portion of the bridge portion.

13. The motor according to claim 1, wherein the fixed portion is disposed on the other side in the axial direction with respect to one axial end portion of the motor shaft.

14. The motor according to claim 13, further comprising a detector that detects a rotation angle of the motor shaft,
    wherein the detector is disposed radially outward of the motor shaft, and
    the fixed portion is disposed radially outward of the detector.

15. A drive apparatus comprising:
    a motor defined in claim 1; and
    a power transmission device that transmits power of the motor to a drive shaft.

* * * * *